United States Patent
Horiuchi et al.

(10) Patent No.: US 9,714,458 B2
(45) Date of Patent: Jul. 25, 2017

(54) PERMANENT MAGNET, MOTOR, AND GENERATOR

(71) Applicant: KABUSHIKI KAISHA TOSHIBA, Minato-ku, Tokyo (JP)

(72) Inventors: Yosuke Horiuchi, Tokyo (JP); Shinya Sakurada, Tokyo (JP); Masaya Hagiwara, Kanagawa (JP); Tsuyoshi Kobayashi, Kanagawa (JP); Tadahiko Kobayashi, Kanagawa (JP); Naoyuki Sanada, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 349 days.

(21) Appl. No.: 14/644,406

(22) Filed: Mar. 11, 2015

(65) Prior Publication Data
US 2016/0086702 A1 Mar. 24, 2016

Related U.S. Application Data

(63) Continuation of application No. PCT/JP2014/004831, filed on Sep. 19, 2014.

(51) Int. Cl.
*C22C 19/07* (2006.01)
*C22C 30/00* (2006.01)
(Continued)

(52) U.S. Cl.
CPC .............. *C22C 19/07* (2013.01); *C22C 30/00* (2013.01); *C22C 30/02* (2013.01); *H01F 1/0557* (2013.01); *H02K 1/02* (2013.01)

(58) Field of Classification Search
CPC ........ H01F 1/053; H01F 1/0557; H01F 1/086; H01F 1/0596; H01F 1/0536; C22C 19/07; C22C 30/02; C22C 30/00; H02K 1/02
(Continued)

(56) References Cited

U.S. PATENT DOCUMENTS 3,947,295 A * 3/1976 Tawara ................. H01F 1/0557
148/101
5,137,587 A * 8/1992 Schultz ................... C04B 35/58
148/103

(Continued)

OTHER PUBLICATIONS

Japanese Office Action for Japanese Patent Application No. 2015-505368 mailed on Apr. 5, 2016.

*Primary Examiner* — Kiley Stoner
(74) *Attorney, Agent, or Firm* — Amin, Turocy & Watson LLP

(57) ABSTRACT

The embodiments provide a high-performance permanent magnet. The permanent magnet includes a sintered body having a composition expressed by a composition formula $R_p Fe_q M_r Cu_t Co_{100-p-q-r-t}$, with carbon in a range from 50 mass ppm to 1500 mass ppm. The sintered body also includes a metallic structure. The metallic structure includes a main phase having a $Th_2 Zn_{17}$ crystal phase, and a secondary phase having a carbide phase of the M element of the composition formula. A ratio ($I_2/I_1$) of a maximum intensity $I_2$ of a diffraction peak at an angle $2\theta$ in a range from 37.5 degrees to 38.5 degrees to a maximum intensity $I_1$ of a diffraction peak at the angle $2\theta$ in a range from 32.5 degrees to 33.5 degrees is greater than 25 but no greater than 80 in an X-ray diffraction pattern obtained by applying an X-ray diffraction measuring method to the sintered body.

7 Claims, 3 Drawing Sheets

(51) Int. Cl.
*C22C 30/02* (2006.01)
*H01F 1/055* (2006.01)
*H02K 1/02* (2006.01)

(58) Field of Classification Search
USPC .................................................. 148/101–103
See application file for complete search history.

(56) References Cited

U.S. PATENT DOCUMENTS

| | | | | | |
|---|---|---|---|---|---|
| 5,137,588 | A | * | 8/1992 | Wecker | C04B 35/58 148/103 |
| 5,288,339 | A | * | 2/1994 | Schnitzke | C01B 21/0602 148/101 |
| 5,395,459 | A | * | 3/1995 | Pinkerton | H01F 1/059 148/101 |
| 5,425,818 | A | * | 6/1995 | Hirosawa | H01F 1/0593 148/101 |
| 5,482,572 | A | * | 1/1996 | Eggert | C22C 1/0441 148/101 |
| 5,609,695 | A | * | 3/1997 | Kojima | B22F 9/023 148/101 |
| 5,684,076 | A | * | 11/1997 | Takahashi | C08K 3/08 148/101 |
| 5,720,828 | A | * | 2/1998 | Strom-Olsen | H01F 1/059 148/101 |
| 5,750,044 | A | * | 5/1998 | Yoneyama | H01F 1/0596 148/301 |
| 5,886,077 | A | * | 3/1999 | Takahashi | C08K 3/08 148/101 |
| 5,916,376 | A | * | 6/1999 | Fukuno | H01F 1/059 148/101 |
| 6,406,559 | B2 | * | 6/2002 | Sakurada | H01F 1/059 148/101 |
| 6,413,327 | B1 | * | 7/2002 | Okajima | H01F 1/059 148/301 |
| 6,416,593 | B2 | * | 7/2002 | Sakurada | H01F 1/059 148/101 |
| 6,468,440 | B1 | * | 10/2002 | Sakurada | H01F 1/059 148/101 |
| 6,546,968 | B2 | * | 4/2003 | Nakagawa | G11B 5/4813 140/104 |
| 6,565,673 | B1 | * | 5/2003 | Gong | H01F 1/0551 148/101 |
| 7,022,252 | B2 | * | 4/2006 | Mochizuki | H01F 1/0571 148/101 |
| 2001/0051246 | A1 | * | 12/2001 | Iwasaki | H01F 1/0558 428/66.6 |
| 2002/0014283 | A1 | * | 2/2002 | Iriyama | B22F 1/0055 148/301 |
| 2002/0054825 | A1 | * | 5/2002 | Sukaki | C22C 1/0441 420/83 |
| 2002/0129872 | A1 | * | 9/2002 | Ohashi | H01F 1/0596 148/103 |
| 2004/0149357 | A1 | * | 8/2004 | Kakimoto | B01J 3/08 148/301 |
| 2005/0189042 | A1 | * | 9/2005 | Ohashi | C22C 1/0441 148/301 |
| 2008/0066575 | A1 | * | 3/2008 | Yang | B22F 3/18 75/229 |
| 2010/0068512 | A1 | * | 3/2010 | Imaoka | B82Y 30/00 428/336 |
| 2010/0289366 | A1 | * | 11/2010 | Komuro | C22C 1/0441 310/156.01 |
| 2011/0057756 | A1 | * | 3/2011 | Marinescu | B22F 1/007 335/302 |
| 2011/0240909 | A1 | * | 10/2011 | Kanda | H01F 1/0555 252/62.55 |
| 2011/0241810 | A1 | * | 10/2011 | Horiuchi | C22C 1/0433 335/302 |
| 2011/0278976 | A1 | * | 11/2011 | Horiuchi | C22C 19/07 310/152 |
| 2012/0074804 | A1 | * | 3/2012 | Horiuchi | H01F 1/0596 310/152 |
| 2012/0075046 | A1 | * | 3/2012 | Hagiwara | H01F 1/0596 335/302 |
| 2012/0145944 | A1 | * | 6/2012 | Komuro | C01G 49/00 252/62.51 R |
| 2012/0146444 | A1 | * | 6/2012 | Horiuchi | C22C 19/07 310/152 |
| 2012/0242180 | A1 | * | 9/2012 | Horiuchi | H01F 1/0596 310/152 |
| 2013/0020527 | A1 | * | 1/2013 | Li | C22C 33/0278 252/62.55 |
| 2013/0076184 | A1 | * | 3/2013 | Horiuchi | B22F 3/02 310/152 |
| 2013/0082559 | A1 | * | 4/2013 | Hagiwara | H02K 1/2766 310/152 |
| 2013/0241333 | A1 | * | 9/2013 | Horiuchi | C22C 19/07 310/152 |
| 2013/0241681 | A1 | * | 9/2013 | Horiuchi | C22C 19/00 335/302 |
| 2013/0241682 | A1 | * | 9/2013 | Horiuchi | H01F 1/0557 335/302 |
| 2013/0257209 | A1 | * | 10/2013 | Sakurada | H01F 1/10 310/152 |
| 2014/0139063 | A1 | * | 5/2014 | Horiuchi | H01F 1/01 310/156.01 |
| 2014/0139064 | A1 | * | 5/2014 | Horiuchi | H01F 1/01 310/156.01 |
| 2014/0139305 | A1 | * | 5/2014 | Horiuchi | H01F 1/01 335/302 |
| 2015/0093285 | A1 | * | 4/2015 | Hinderberger | C22C 38/00 420/83 |
| 2015/0132174 | A1 | * | 5/2015 | Marinescu | H01F 1/0577 419/19 |
| 2015/0143952 | A1 | * | 5/2015 | Horiuchi | H01F 1/0557 75/228 |
| 2015/0147228 | A1 | * | 5/2015 | Endo | H02K 1/02 420/582 |
| 2015/0194246 | A1 | * | 7/2015 | Horiuchi | C22C 19/07 310/152 |
| 2015/0221422 | A1 | * | 8/2015 | Sakurada | C22C 1/00 310/152 |
| 2015/0228385 | A1 | * | 8/2015 | Horiuchi | H01F 1/086 310/152 |
| 2015/0270038 | A1 | * | 9/2015 | Endo | H01F 1/0596 310/152 |
| 2015/0270039 | A1 | * | 9/2015 | Horiuchi | C22C 19/07 310/152 |
| 2015/0270040 | A1 | * | 9/2015 | Horiuchi | C22C 19/07 310/152 |
| 2015/0318089 | A1 | * | 11/2015 | Li | H01F 1/059 335/302 |
| 2015/0380134 | A1 | * | 12/2015 | Machida | H01F 1/055 335/302 |
| 2016/0086702 | A1 | * | 3/2016 | Horiuchi | C22C 19/07 310/44 |
| 2016/0155548 | A1 | * | 6/2016 | Horiuchi | C22C 19/07 310/152 |
| 2017/0002445 | A1 | * | 1/2017 | Hagiwara | C22C 19/07 |
| 2017/0018341 | A1 | * | 1/2017 | Horiuchi | B22F 3/10 |
| 2017/0018978 | A1 | * | 1/2017 | Horiuchi | H02K 1/17 |

* cited by examiner

PERMANENT MAGNET, MOTOR, AND GENERATOR

CROSS-REFERENCE TO RELATED APPLICATIONS

This application is a continuation of prior International Application No. PCT/JP2014/004831 filed on Sep. 19, 2014; the entire contents of all of which are incorporated herein by reference.

FIELD

Embodiments disclosed herein relate generally to a permanent magnet, a motor, and a generator.

BACKGROUND

Known examples of the high-performance rare earth magnet include an Sm—Co-based magnet, an Nd—Fe—B-based magnet, and a similar magnet. Fe and Co in such magnets contribute to an increase in saturation magnetization. These magnets contain a rare earth element such as Nd and Sm. Derived of a behavior of 4f electron in the rare earth elements at a crystal field, the rare earth elements bring about large magnetic anisotropy. This creates a large coercive force, thereby providing a high-performance magnet.

Such high performance magnet is mainly used for electrical devices such as a motor, a speaker, and a measuring instrument. In recent years, requests on downsizing, weight reduction, and low power consumption have been increased on various electrical devices. In response to the requests, there is a demand for a permanent magnet with higher performance that has an improved maximum magnetic energy product ($BH_{max}$) of the permanent magnet. In recent years, a variable magnetic flux motor has been proposed. This contributes to an improvement in efficiency of a motor.

Since the Sm—Co-based magnet features high Curie temperature, the Sm—Co-based magnet can achieve good motor property at high temperature. However, a higher coercive force, higher magnetization, and an improvement in a magnetic property such as a squareness ratio have been desired. It is presumed that high concentration of Fe is effective to increase the magnetization of the Sm—Co-based magnet. However, with the conventional manufacturing method, high concentration of Fe deteriorates the magnetic property. In order to provide a high-performance magnet for motor, therefore, a technique that provides the good magnetic property while improving the magnetization with the high Fe concentration composition is necessary.

SUMMARY

An object of the embodiments is to regulate a metallic structure of an Sm—Co-based magnet thereby providing a high-performance permanent magnet.

A permanent magnet according to an embodiment has a sintered body. The sintered body has a composition expressed by a composition formula: $R_p Fe_q M_r Cu_t Co_{100-p-q-r-t}$ (in the formula, R is at least one element selected from the group consisting of rare earth elements, M is at least one element selected from the group consisting of Zr, Ti, and Hf, p is a number satisfying a condition of $10.8 \leq p \leq 12.5$ atomic percent (at %), q is a number satisfying a condition of $25 \leq q \leq 40$ atomic percent, r is a number satisfying a condition of $0.88 \leq r \leq 4.5$ atomic percent, and t is a number satisfying a condition of $3.5 \leq t \leq 13.5$ atomic percent). The composition also includes carbon from 50 mass ppm to 1500 mass ppm. The sintered body also has a metallic structure. The metallic structure includes a main phase and a secondary (auxiliary) phase. The main phase includes a $Th_2Zn_{17}$ crystal phase. The secondary phase has a carbide phase of the M element of the composition formula. A ratio ($I_2/I_1$) of a maximum intensity $I_2$ of diffraction peaks at an angle $2\theta$ in a range from 37.5 degrees to 38.5 degrees to a maximum intensity $I_1$ of diffraction peaks at an angle $2\theta$ in a range from 32.5 degrees to 33.5 degrees is greater than 25 but no greater than 80 in an X-ray diffraction pattern obtained by applying an X-ray diffraction measuring method to the sintered body.

DETAILED DESCRIPTION

Figure 1:
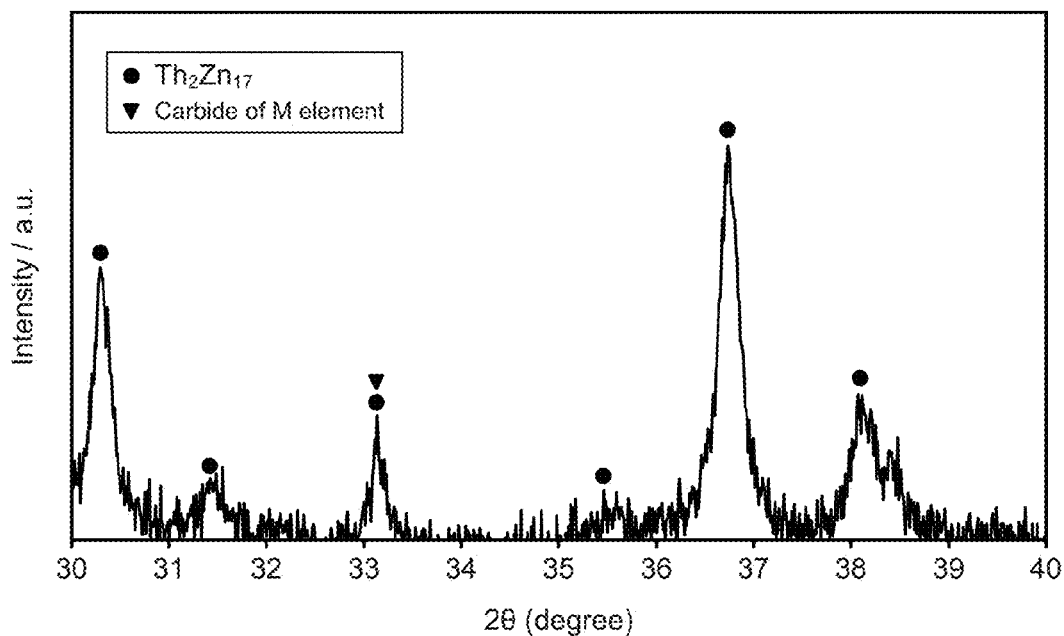
FIG. 1 illustrates an example of an X-ray diffraction pattern.

Embodiments will now be described with reference to the accompanying drawings. The drawings are schematically illustrated. For example, the relationship between a thickness and plane dimensions, a ratio of thicknesses of respective layers, and similar parameters may differ from actual parameters. In the embodiments, like or same reference numerals designate corresponding or identical configurations, and therefore such configurations will not be described repeatedly.

First Embodiment

The following describes a permanent magnet of this embodiment.

<Exemplary Configuration of Permanent Magnet>

The permanent magnet has a sintered body, and the sintered body has a composition expressed by a composition formula: $R_p Fe_q M_r Cu_t Co_{100-p-q-r-t}$ (in the formula, R is at least one element selected from the group consisting of rare earth elements, M is at least one element selected from the group consisting of Zr, Ti, and Hf, p is a number satisfying a condition of $10.8 \leq p \leq 12.5$ atomic percent, q is a number satisfying a condition of $25 \leq q \leq 40$ atomic percent, r is a number satisfying a condition of $0.88 \leq r \leq 4.5$ atomic percent, and t is a number satisfying a condition of $3.5 \leq t \leq 13.5$ atomic percent). The composition also includes carbon from 50 mass ppm to 1500 mass ppm. In the permanent magnet, the atom ratio in the composition formula is an atom ratio when a sum of R, Fe, M, Cu and Co is taken as 100 atomic percent. The sintered body contains a trace amount of carbon.

The R in the composition formula is an element that can provide a magnet material with large magnetic anisotropy. The R element is one element or a plurality of elements selected from the group consisting of the rare earth elements including, for example, yttrium (Y). For example, samarium (Sm), cerium (Ce), neodymium (Nd), praseodymium (Pr), or a similar material can be used as the R element. Especially, the use of Sm is preferable. For example, in the case where a plurality of elements containing Sm are used as the R element, the Sm concentration is designed to be 50 atomic percent or more with respect to all the elements usable as the R element. This enhances performance of the magnet material, for example, a coercive force. It is further preferable to design Sm to be 70 atomic percent or more, especially 90 atomic percent or more, with respect to the elements usable as the R element.

When the concentration of the element that can be used as the R element is set to between 10.8 atomic percent and 12.5 atomic percent inclusive, the coercive force can be increased. If the concentration of the element that can be used as the R element is less than 10.8 atomic percent, then a large amount of α-Fe precipitates, and this decreases the coercive force. If the concentration of the element that can be used as the R element is greater than 12.5 atomic percent, then the saturation magnetization is deteriorated. Preferably, the concentration of the element that can be used as the R element is between 11.0 atomic percent and 12.0 atomic percent inclusive.

The M in the composition formula is an element that can express a large coercive force and a high intensity with the composition of high iron (ferrum) concentration. The M element is, for example, one element or a plurality of elements selected from the group consisting of titanium (Ti), zirconium (Zr), and hafnium (Hf). If the content r of the M element is greater than 4.5 atomic percent, then a heterogeneous phase that excessively contains the M element is likely to be generated. This tends to deteriorate both the coercive force and the magnetization. If the content r of the M element is less than 8.8 atomic percent, then an effect of increasing the Fe concentration tends to become small. In view of this, the content r of the M element is preferably between 0.88 atomic percent and 4.5 atomic percent inclusive. The content r of the element M is more preferably between 1.15 atomic percent and 3.57 atomic percent inclusive. The content r is further preferably between 1.49 atomic percent and 2.24 atomic percent inclusive, and particularly preferably between 1.55 atomic percent and 2.23 atomic percent inclusive.

The M element preferably contains at least Zr. In particular, when 50 atomic percent or more of the M element is Zr, this enhances the coercive force of the permanent magnet. Among the M elements, the Hf is especially expensive. If the Hf is used, therefore, a small amount of use is preferable. For example, it is preferable that the content of the Hf be less than 20 atomic percent of the M element.

Cu is an element that can express the high coercive force in the magnet material. The content of Cu is, for example, preferably from 3.5 atomic percent up to 13.5 atomic percent. If the content of Cu is greater than this range, the magnetization is significantly reduced. If the content of Cu is smaller than this range, it becomes difficult to obtain a good magnetic property. The content t of Cu is more preferably from 3.9 atomic percent up to 9.0 atomic percent. The content t of Cu is further preferably from 4.4 atomic percent up to 5.7 atomic percent.

Fe is an element which mainly performs the magnetization of the magnet material. When the content of Fe is large, the saturation magnetization of the magnet material can be enhanced. However, too much amount of content Fe is less likely to obtain a desired crystal phase because of precipitation of α-Fe and phase separation. This may decrease the coercive force. In view of this, the content q of Fe is preferably from 25 atomic percent up to 40 atomic percent. The content q of Fe is more preferably from 28 atomic percent up to 36 atomic percent. The content q is further preferably from 30 atomic percent up to 33 atomic percent.

Co is an element which performs the magnetization of the magnet material and can express a high coercive force. Containing a large amount of Co brings about the high Curie temperature and enhances thermal stability of the magnetic property. A small amount of Co content decreases these effects. However, excessive addition of Co relatively reduces the proportion of Fe, and may result in deterioration of the magnetization. Replacing 20 atomic percent or less of Co with one element or a plurality of elements selected from the group consisting of Ni, V, Cr, Mn, Al, Si, Ga, Nb, Ta, and W enhances the magnetic property, for example, the coercive force.

Carbon is one of inevitable impurities which is contaminated during the fabrication process, and is included in a far smaller amount compared to constituent elements such as R, Fe, M, Cu and Co in the composition formula. It is assumed that the carbon is contaminated due to, during the fabrication process of the permanent magnet, for example, lubricating oil used for the pressurized molding of the alloy powder, contamination from a container of a ball mill used for the pulverization, carbon in a solvent of the ball mill, a carbon heater used for the sintering and contamination from an interior member inside a sintering furnace or the like.

Carbon is an element that affects the mechanical strength of the permanent magnet. In view of this, preferably the content of carbon is, for example, between 50 mass ppm and 1500 mass ppm inclusive. If the carbon concentration is less than 50 mass ppm or greater than 1500 mass ppm, then the mechanical strength of the permanent magnet is likely to be deteriorated. More preferably, the carbon concentration is equal to or smaller than 700 mass ppm, further preferably, equal to or smaller than 500 mass ppm, and yet further preferably, equal to or smaller than 300 mass ppm.

The permanent magnet of this embodiment has a two-dimensional metallic structure. The two-dimensional metallic structure includes the main phase and a grain boundary phase. The main phase includes a hexagonal $Th_2Zn_{17}$ crystal phase (2-17 crystal phase). The grain boundary phase is arranged between crystal grains of the main phase. Furthermore, the main phase has a cell phase and a Cu rich phase. The cell phase includes a 2-17 crystal phase. The Cu rich phase includes a hexagonal $CaCu_5$ crystal phase (1-5 crystal phase). Preferably, the Cu rich phase is formed around the cell phase. The above structure may be referred to as a cell structure. The Cu rich phase also includes a cell wall phase that separates the cell phase. The c-axis of the $Th_2Zn_{17}$ crystal phase extends in parallel to the c-axis of the $TbCu_7$ crystal phase, which is the axis of easy magnetization. In other words, the c-axis of the $Th_2Zn_{17}$ crystal phase extends in parallel to the axis of easy magnetization. It should be noted that the term "parallel" may include an approximately parallel condition, i.e., ±10 degree deviation from the true parallel.

The Cu rich phase is a phase of high Cu concentration. The Cu concentration of the Cu rich phase is higher than the Cu concentration of the $Th_2Zn_{17}$ crystal phase. For example, the Cu concentration of the Cu rich phase is preferably 1.2 times or more of the Cu concentration of the $Th_2Zn_{17}$ crystal phase. The Cu rich phase is, for example, present lineally or in the form of plate at a cross section including the c axis of the $Th_2Zn_{17}$ crystal phase. The structure of the Cu rich phase is not specifically limited. For example, the hexagonal $CaCu_5$ crystal phase (1-5 crystal phase) can be listed as an exemplary structure of the Cu rich phase. The permanent magnet may include a plurality of Cu rich phases of different phases.

The magnetic domain wall energy of the Cu rich phase is greater than the magnetic domain wall energy of the $Th_2Zn_{17}$ crystal phase. This difference in the magnetic domain wall energy prohibits movements (shifting) of the magnetic domain wall. Specifically, the Cu rich phase serves as a pinning site, and therefore it is possible to restrict the movements (shifting) of the magnetic domain wall between a plurality of cell phases. In particular, when the cell structure is formed, the effect of restricting the movements of the magnetic domain wall is enhanced. This may be referred to as magnetic domain wall pinning effect. Thus, it is more preferred that the Cu rich phase is formed around the cell phase.

In the Sm—Co-based magnet that contains Fe in the amount of 25 atomic percent or more, it is preferred that the Cu concentration of the Cu rich phase is between 10 atomic percent and 60 atomic percent inclusive. When the Cu concentration of the Cu rich phase increases, the good magnetic property is obtained. In the area where the Fe concentration is high, the Cu concentration of the Cu rich phase is likely to vary. For example, one Cu rich phase may have a high magnetic domain wall pinning effect and another Cu rich phase may have a small magnetic domain wall pinning effect. This deteriorates the magnetic property.

If the magnetic domain wall shifts from the pinning site and moves, the magnetization is inverted correspondingly. This decreases the magnetization. If all the magnetic domain walls shift from the pinning site in a certain magnetic field upon application of the external magnetic field, the decrease in the magnetization occurs little upon application of the magnetic field. Accordingly, a good squareness ratio is obtained. In other words, if the magnetic domain wall shifts from the pinning site and moves in a magnetic field that is weaker than the coercive force upon application of a magnetic field, it is assumed that the magnetization drops correspondingly and the magnetic property drops. In order to avoid or reduce the deterioration of the magnetic property such as the decrease in the magnetization, it is assumed that increasing the area of the cell structure is important.

The above-described cell structure is not likely to be formed in, for example, the grain boundary phase. Also, the cell structure is difficult to be formed around the crystal grains of the main phase. It is assumed that this is because a secondary phase, which has a carbide phase of the M element, precipitates in the crystal grains of the sintered body and/or at the crystal grain boundary. The carbide phase of the M element is a carbide phase of, for example, ZrC. ZrC is nonmagnetic. For example, during the sintering process, the M element contained in the main phase may react with carbon or its compound in the sintering furnace, and therefore the carbide phase of the M element may precipitate. The carbide phase of the M element has a grain shape having a diameter of, for example, from about 0.5 to about 5 μm.

When the carbide phase of the element M is precipitated, the concentration of the element M in the surrounding parent phase is lowered. If the concentration of the element M of the parent phase decreases, then the composition deviation of the parent phase occurs. Thus, a Cu rich phase (also referred to as "Cu rich heterogeneous phase") having $Ce_2Ni_7$ crystal phase such as $Sm_2Co_7$ phase or the like is likely to be generated. In the Cu rich heterogeneous phase, the cell structure is unlikely to be formed. Also, in the circumference of the Cu rich heterogeneous phase, as the Cu concentration is lowered, the cell structure is unlikely to be formed. As a result, the magnet property is likely to be deteriorated.

In the permanent magnet of low Fe concentration, even if the carbide phase of the element M is precipitated, still the Cu rich heterogeneous phase is unlikely to occur. Thus, degradation of the coercive force and decrease in the magnetization or the like are unlikely to occur. On the other hand, in the permanent magnet of high iron (Fe) concentration, the carbide phase of the element M significantly affects the magnet property. Thus, if the ratio of the carbide phase of the element M is large, then it causes degradation of the coercive force and decrease in the magnetization or the like. Accordingly, the ratio of the carbide phase of the element M is preferably small.

Furthermore, it is assumed that the carbide phase of the element M also affects the mechanical strength of the permanent magnet of high iron (Fe) concentration. If the ratio of the carbide phase of the element M is too large, then the grain boundary strength is lowered so that the mechanical strength is also lowered. On the other hand, if the ratio of the carbide phase of the element M is too small, then the crack extension in the grain boundary phase is not suppressed so that the mechanical strength is also lowered. In other words, although the carbide phase of the excessive element M causes degradation of the coercive force and decrease in the magnetization or the like, the carbide of a slight amount of element M suppresses degradation of the coercive force and decrease in magnetization, and also improves the mechanical strength. It means that, by controlling the ratio of the carbide phase of the element M, it is possible to improve the magnet property and the mechanical strength in the permanent magnet of high iron (Fe) concentration.

In the above mentioned permanent magnet, the coercive force may be, for example, equal to or greater than 1300 kA/m, further equal to or greater than 1400 kA/m, yet further equal to or greater than 1500 kA/m. Also, in the permanent magnet, the residual magnetization may be, for example, equal to or greater than 1.19 T, further equal to or greater than 1.20 T, yet further equal to or greater than 1.21 T. Moreover, in the permanent magnet, the deflective strength may be, for example, equal to or greater than 100 MPa, further equal to or greater than 150 MPa, yet further equal to or greater than 160 MPa. Moreover, preferably, the sintered body has the density equal to or greater than 8.2 g/cm$^3$. By employing the density equal to or greater than 8.2 g/cm$^3$, it is possible to further improve the mechanical strength of the permanent magnet.

The ratio of the carbide phase of the element M can be evaluated from the diffraction peak strength of the X-ray diffraction patterns which are obtainable by, for example, the X-ray Diffraction (XRD) measurement. FIG. 1 shows an example of the X-ray diffraction patterns (angle 2θ=30 to 40 degrees) which is obtained by the X-ray diffraction measurement of the sintered body. The horizontal axis shows the angle 2θ, and the vertical axis shows the peak strength. The carbide phase of the element M has the diffraction peak at the angle 2θ in the vicinity of 33 degrees. It is assumed that, as the strength of the above mentioned diffraction peak is higher, then the ratio of the carbide phase of the element M becomes larger. However, because $Th_2Zn_{17}$ phase also has the diffraction peak at the angle 2θ in the vicinity of 33 degrees, it is difficult to differentiate the ratio of the carbide phase of the element M from the $Th_2Zn_{17}$ phase by solely relying on such peak.

In view of this, the ratio of the carbide phase of the element M is evaluated by use of the strength ratio of the diffraction peak located at the angle 2θ in the vicinity of 33 degrees to the diffraction peak located at the angle 2θ in the vicinity of 38 degrees. The diffraction peak located at the angle 2θ in the vicinity of 38 degrees is one of the diffraction peak inherent in the $Th_2Zn_{17}$ phase. It is the peak that is not obtainable in the TbCu$_7$ crystal phase (1-7 crystal phase) serving as, for example, a precursor of a phase separated composition.

When the ratio of the carbide phase of the element M is small, the strength of the diffraction peak located at the angle 2θ in the vicinity of 33 degrees is small with respect to the diffraction peak located at the angle 2θ in the vicinity of 38 degrees. However, when the ratio of the carbide phase of the element M is large, the strength of the diffraction peak located at the angle 2θ in the vicinity of 33 degrees becomes larger. Thus, the ratio of the carbide of the element M can be evaluated by use of the strength ratio of the diffraction peak located at the angle 2θ in the vicinity of 33 degrees to the diffraction peak located at the angle 2θ in the vicinity of 38 degrees.

The diffraction peak strength in the X-ray diffraction patterns is defined in the following manner. Firstly, using the XRD equipment, the diffraction peak of a sample is measured that uses powder of the sintered body sample of approximately tens of μm. In this measurement, the tubular bulb is Cu, the tube voltage is 45 kV, the tube current is 200 mA, and X-ray is CuKα ray. Also, the scanning axis is 2θ, the scanning mode is continuous, the scanning step is 0.01 degrees, the scanning ratio (speed) is 20 degrees/minute, and the measurement range of the angle 2θ is between 25 degrees and 55 degrees.

Next, the data processing is carried out with respect to measurement data. PDXL2 ver. 2.1.3.4 is used as an analysis software, and data in which a background is eliminated is used as the X-ray diffraction patterns. In the X-ray diffraction patterns, the diffraction peak of the maximum strength which is located at the angle 2θ within the range between 32.5 degrees and 33.5 degrees inclusive is defined as the diffraction peak located at the angle 2θ in the vicinity of 33 degrees. Likewise, the diffraction peak of the maximum strength which is located at the angle 2θ within the range between 37.5 degrees and 38.5 degrees inclusive is defined as the diffraction peak located at the angle 2θ in the vicinity of 38 degrees.

The diffraction peak located at the angle 2θ in the vicinity of 33 degrees is, preferably, the diffraction peak of the maximum strength which is located at the angle 2θ within the range between 32.7 degrees and 33.3 degrees inclusive, and more preferably, the diffraction peak of the maximum strength which is located at the angle of 2θ within the range between 32.9 degrees and 33.1 degrees inclusive. Likewise, the diffraction peak located at the angle 2θ in the vicinity of 38 degrees is, preferably, the diffraction peak of the maximum strength which is located at the angle of 2θ within the range between 37.7 degrees and 38.3 degrees inclusive, and more preferably, the diffraction peak of the maximum strength which is located at the angle 2θ within the range between 37.9 degrees and 38.1 degrees in elusive.

In the X-ray diffraction patterns, for example, $I_1$ defines the maximum strength of the diffraction peak located at the angle 2θ within the range between 32.5 degrees and 33.5 degrees inclusive (the diffraction peak located at the angle 2θ in the vicinity of 33 degrees.) Likewise, b defines the maximum strength of the diffraction peak located at the angle 2θ within the range between 37.5 degrees and 38.5 degrees inclusive (the diffraction peak located at the angle 2θ in the vicinity of 38 degrees.) For the above mentioned permanent magnet, in the X-ray diffraction patterns which is obtained by the X-ray diffraction measurement of the above mentioned sintered body, the ratio of $I_2$ to $I_1$ ($I_2/I_1$) is greater than 25 and equal to or less than 80. If $I_2/I_1$ is greater than 80, then the crack extension in the grain boundary phase is not suppressed so that mechanical strength is lowered. Also, if $I_2/I_1$ is less than 25, then an existential ratio of the carbide phase of the element M in the grain boundary phase becomes higher so that mechanical strength is also lowered. More preferably, is between 30 and 75 inclusive. Further preferably, $I_2/I_1$ is between 35 and 70 inclusive.

As described above, for the permanent magnet, the ratio of the carbide phase of the element M is controlled such that, in the X-ray diffraction patterns, the ratio of maximum strength of the diffraction peak located at the angle 2θ within the range between 37.5 degrees and 38.5 degrees inclusive with respect to the diffraction peak located at the angle 2θ within the range between 32.5 degrees and 33.5 degrees inclusive is within the above mentioned range. Accordingly, in the permanent magnet of high iron (Fe) concentration, both the magnet property and the mechanical strength can be improved.

The composition of the permanent magnet is analyzed by, for example, an inductively coupled plasma (ICP) emission spectrochemical analysis method, an SEM-energy dispersive X-ray spectroscopy (SEM-EDX), a transmission electron microscope-EDX (TEM-EDX) or a similar method. The volumetric percentages (volume ratios) of the respective phases are comprehensively determined based on observations with the electron microscope and the optical microscope as well as X-ray diffraction and other techniques. For example, the composition of the permanent magnet is obtained by an areametric analysis method that uses an electron micrograph of a cross section of the permanent magnet. The cross section of the permanent magnet is a cross section of a substantially center part that has the largest surface area of the specimen.

The metallic structure such as the Th$_2$Zn$_{17}$ crystal phase, the Cu rich phase, the Cu rich heterogeneous phase, and the carbide phase of the M element is identified, for example, in the following manner. Firstly, samples are observed by a scanning transmission electron microscope (STEM). Prior to this, the samples may be observed by a scanning electron microscope (SEM) to find the location of the grain boundary phase, and the samples may be processed by a focused ion beam (FIB) such that the grain boundary phase is present in the field of vision. This can enhance the observation efficiency. The samples are those which have undergone the aging treatment. Preferably, the samples are not yet magnetized.

Subsequently, the concentrations of the respective elements in the cell phase, the Cu rich phase, the Cu rich heterogeneous phase, the carbide phase of the M element, and other phases are measured by, for example, an STEM-energy dispersive X-ray spectroscopy (STEM-EDX).

When the concentrations of the respective elements are measured by the STEM-EDX, specimens are cut (taken out) from the interior of the sample at the depth of 1 mm or more from the surface of the sample. Also, the observation is carried out at the magnification of 100 k power (×100) to a plane that is parallel to the axis of easy magnetization (c-axis). The mapping images of the Cu, and the M element are also obtained.

When the Cu mapping image is overlapped on the M element mapping image, an area of high Cu concentration appears. This area is a Cu rich phase. An area having a high Cu concentration and a high M element concentration is the Cu rich heterogeneous phase. An area having a low Cu concentration and a high M element concentration is the carbide phase of the M element and other phases. It should be noted that a mapping image of C may be obtained to identify the carbide phase of the M element.

Figure 2:
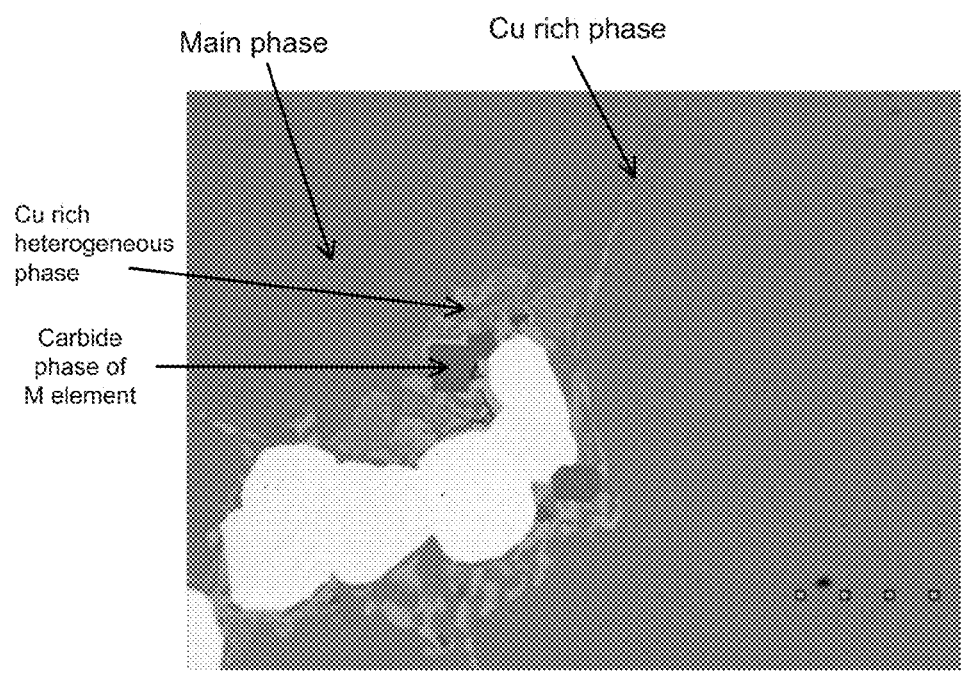
FIG. 2 illustrates an example of an SEM image of a sintered body.

FIG. 2 shows an example of the SEM image of the metallic structure. In the metallic structure of FIG. 2, there are formed a linear Cu rich phase, a carbide phase of the grain M element and other phase in addition to the $Th_2Zn_{17}$ crystal phase. It is also seen that the Cu rich heterogeneous phase is formed around the carbide phase of the grain M element.

For concentration measurement of the elements in each phase, a 3-dimension atom probe (3DAP) may be used. The analysis method using the 3DAP is an analysis method that applies a voltage to perform an electric field evaporation on an observed specimen and detects ions, which are generated upon the electric field evaporation, with a two-dimensional detector to identify an atomic arrangement. Ionic species are identified from flight time spent to reach the two-dimensional detector. Individually detected ions are consecutively detected in a depth direction and the ions are arranged (reconstructed) in the detected order. Then, a three-dimensional atomic distribution is obtained. Compared to the concentration measurement with the TEM-EDX, this analysis method can measure each element concentration in the crystal phase more precisely.

The element concentration in each phase is measured using the 3DAP in accordance with the following procedure. Firstly, the specimen is diced to thin pieces. From the thin pieces, needle-shaped specimens for pickup atom probe (AP) are prepared with the FIB.

The measurement with the 3DAP is performed on the inside of the sintered body. The inside of the sintered body is measured as follows. Firstly, at a center part of a longest side of a surface having the maximum area, the composition is measured at a surface portion and the inside of the cross section vertically cut to the side (in the case of a curved line, vertical to a tangent line of the center portion). The measured position is defined as follows. In the cross section, the one-half position of each side is set as a starting point. A first reference line and a second reference line are set. The first reference line is drawn vertical to the side and toward the inside up to the end portion. The second reference line is drawn from the center of each corner portion as the starting point, with the one-half position of an angle of an inner angle of the corner portion, toward the inside up to the end portion. Positions of 1% length of the reference lines from the starting points of the first reference line and second reference line are defined as surface portions, and the position of 40% is defined as the inside. In the case where a corner portion has a curvature by, for example, chamfering, an intersection point of the extended adjacent sides is set as an end portion of the side (the center of the corner portion). In this case, the measured position is not from the intersection point but is a position from a part in contact with the reference line.

By deciding the measured positions as described above, for example, in the case of the cross section being a square, the reference lines include four first reference lines and four second reference lines, eight in total. The measured positions become eight positions at the surface portion and inside, respectively. In this embodiment, all the eight positions of the surface portion and inside are preferably within the above-described composition range. However, it is only necessary that at least four positions or more of the surface portion and inside be within the above-described composition range. In this case, the sole reference line does not specify the relationship between the surface portion and the inside. The observation plane inside the sintered body which is specified in this manner is polished and smoothed, and then is observed. For example, the observed positions by the TEM-EDX during the concentration measurement are arbitrary twenty positions in each phase. An average value of these measured values, which do not include the maximum value and the minimum value among all the measured values at the respective positions, is calculated. This average value is regarded as the concentration of the element concerned. The measurement with the 3DAP is carried out in a similar manner.

In the measurement results of the concentrations in the Cu rich phase with the 3DAP, it is preferred that the Cu concentration profile in the Cu rich phase is sharp. Specifically, the full width at half maximum (FWHM) of the Cu concentration profile is preferably equal to or smaller than 5 nm. With this Cu concentration profile, it is possible to obtain a high coercive force. This is because the magnetic domain wall energy difference steeply appears between the cell phase and the Cu rich phase and the pinning is easily applied on the magnetic domain wall when the Cu profile in the Cu rich phase is sharp.

The full width at half maximum (FWHM) of the Cu concentration profile in the Cu rich phase is obtained in the following manner. Based on the above-described method with the 3DAP, the highest value (PCu) of the Cu concentration is measured (calculated, found) from the Cu profile. Then, the width at which a half (PCu/2) of the maximum value (peak) is reached is measured, i.e., the full width at half maximum (FWHM) is measured. Such measurement is carried out for ten peaks, and the average value of the ten values is defined as the full width at half maximum (FWHM) of the Cu profile. When the full width at half maximum (FWHM) of the Cu profile is equal to or less than 3 nm, the coercive force is more enhanced. When the full width at half maximum (FWHM) of the Cu profile is equal to or less than 2 nm, the coercive force is further enhanced.

The diameters of the cell phase, the Cu rich phase, the Cu rich heterogeneous phase, the carbide phase of the M element, and other phases are obtained as follows. An arbitrary phase is selected in the STEM-EDX mapping image, and a straight line A is drawn in the selected phase such that the straight line A becomes the longest line with the opposite ends of the straight line being in contact with other phases. Then, a straight line B is drawn to extend through the midpoint of the straight line A such that the straight line B is perpendicular to the straight line A and the opposite ends of the straight line B are in contact with other phases. The average of the length of the straight line A and the length of the straight line B is taken as the diameter D of the phase. The diameter D is calculated for at least one arbitrary phase in this manner. The diameters D are calculated in the five fields of vision for each sample. The average of the diameters (D) is defined as the diameter (D) of the phase.

The average grain diameter of the crystal grains of the main phase may be measured by the SEM-electron backscattering pattern (SEM-EBSP). The procedure for obtaining the average grain diameter of the crystal grains will be described below. Firstly, a pre-treatment is carried out. Specifically, a specimen is embedded in an epoxy resin material, and undergoes the mechanical polishing and buffing. Then, the resulting specimen is washed with water, and the water removal is carried out by the air blow. After the water removal, the specimen is surface treated by a dry etching machine. Subsequently, the surface of the specimen is observed with a scanning electron microscope S-4300SE, manufactured by Hitachi High-Technologies Corporation, that has an EBSD system—Digiview, manufactured by TSL Co., Ltd. The observation conditions include an accelerating voltage of 30 kV and the measuring area of 500 μm×500 μm.

The observation results are used to obtain the average grain diameter of the crystal grains present in the measured area under the following conditions.

The directions of all pixels in the measurement area are measured, with the step size being 2 μm. If there is a direction difference of 5 degrees or more between adjacent pixels at a boundary, then that boundary is regarded as a grain boundary phase. It should be noted, however, that if the measuring points in a crystal grain is less than five, that crystal grain is not regarded as the crystal grain, and that if a crystal grain reaches an end of the measurement area, that crystal grain is not regarded as the crystal grain. The grain area is an area in a crystal grain surrounded by the grain boundary phase. The average grain area is an average value of areas of crystal grains that exist in the measurement area. The grain diameter is a diameter of a perfect circle that has the same area as the area in the same crystal grain. The average grain diameter is an average value of grain diameters of crystal grains that exist in the measurement area. It should be noted that the crystal grain that has a grain diameter of 10 μm or less can be a heterogeneous phase. Thus, the crystal grains having a grain diameter of 10 μm or less are excluded when determining the average grain diameter.

The squareness ratio is defined as follows. Firstly, a DC B-H tracer measures DC magnetization characteristics at room temperature. Subsequently, from the B-H curve obtained from the measurement result, residual magnetization $M_r$, the coercive force and a maximum energy product $(BH)_{max}$, which are basic properties of a magnet, are obtained. At this time, $M_r$ is used to obtain a maximum theoretical value $(BH)_{max}$ by the following expression (1).

$$(BH)_{max}(\text{theoretical value})=M_r^2/4\mu_0 \quad (1)$$

The squareness ratio is evaluated from a ratio of $(BH)_{max}$ obtained by the measurement to $(BH)_{max}$ (theoretical value), and is obtained by the following expression (2).

$$(BH)_{max}(\text{actually measured value})/(BH)_{max}(\text{theoretical value})\times 100 \quad (2)$$

The permanent magnet is, for example, also used as a bonded magnet. For example, a variable magnet in a variable magnetic flux drive system is proposed. The use of the magnet material for the variable magnet results in efficiency improvement, downsizing, and cost reduction of the system. To use the permanent magnet as the variable magnet, the aging treatment condition needs to be changed, for example, to limit the coercive force to between 100 kA/m and 350 kA/m inclusive.

<Method for Manufacturing Permanent Magnet>

The following describes an exemplary method for manufacturing the permanent magnet. Firstly, prepared is an alloy powder that contains prescribed elements which are necessary to compose a permanent magnet. Then, the alloy powder is put in a metallic mold or die disposed in an electromagnet, and a magnetic field is applied onto the alloy powder while the alloy powder is shaped (molded) to a particular form by pressure molding (by pressing). A green compact (pressed powder) that has an oriented crystallographic axis is fabricated.

For example, a molten metal prepared by an arc melting method or a high frequency (induction) melting method may be cast to obtain an alloy ingot. The alloy ingot is crushed (pulverized) to prepare an alloy powder. In order for the alloy powder to have a desired composition, the alloy powder may be prepared from a mixture of powders having different compositions. A mechanical alloying method, a mechanical grinding method, a gas atomizing method, a reduction diffusion method or a similar method may be employed to prepare the alloy powder. When an alloy thin ribbon or strip is fabricated by the strip cast method, a flake-shaped alloy thin ribbon or strip is fabricated. Then, the alloy thin ribbon is crushed (pulverized) to provide the alloy powder. For example, the strip cast method pours molten alloy to a cooling roller that rotates at a peripheral velocity of between 0.1 m/second and 20 m/second inclusive. This brings about the thin ribbon that is formed by consecutively coagulating the molten alloy at a thickness of 1 mm or less. The peripheral velocity of less than 0.1 m/second is likely to vary the composition in the thin ribbon. The excess of the peripheral velocity of 20 m/second possibly deteriorates the magnetic property because, for example, the crystal grains become too fine. The peripheral velocity of the cooling roller is from 0.3 m/second up to 15 m/second, and further preferably from 0.5 m/second up to 12 m/second.

Furthermore, performing the heat treatment on the alloy powder or an alloy material before crushing homogenizes this material. For example, a jet mill or a ball mill may be used to crush the material. It should be noted that crushing the material in an inert gas atmosphere or in an organic solvent prevents oxidation of the powder. When the average grain diameter of the powder after crushing is between 2 μm and 5 μm inclusive, and a percentage of the powder at the grain diameter of between 2 μm and 10 μm inclusive is 80% or more of the entire powder, a degree of orientation increases and the coercive force becomes large. To satisfy these conditions, the crushing with the jet mill is preferable.

For example, in the case of crushing with the ball mill, even if the average grain diameter of the powder is between 2 μm and 5 μm inclusive, a large amount of fine powder with the grain diameter of submicron level is contained. Aggregation of this fine powder is less likely to align the c-axis of the crystal at the $TbCu_7$ phase in the axis of easy magnetization direction in magnetic field orientation during pressing. This is likely to cause the deterioration of the degree of orientation. The fine powder possibly increases an amount of oxide in the sintered body, thereby resulting in deterioration of the coercive force. In particular, when the Fe concentration is equal to or greater than 25 atomic percent, a proportion of the powder, after crushing, having the grain diameter of 10 μm or more is preferably 10% or less of the entire powder. The concentration of Fe of 25 atomic percent or more increases an amount of heterogeneous phase in the ingot that is a raw material. In this heterogeneous phase, not only the amount of powder increases but also the grain diameter tends to be large such that possibly the grain diameter becomes 20 μm or more.

When crushing such ingot, for example, the powder with the grain diameter of 15 μm or more possibly becomes the powder of the heterogeneous phase as it is. If the pulverized powder containing such coarse powder of the heterogeneous phase is pressed in a magnetic field to form the sintered body, the heterogeneous phase remains. This causes the deterioration of the coercive force, deterioration of magnetization, deterioration of squareness, or a similar deterioration. The deterioration of squareness makes the magnetization difficult. In particular, magnetization after assembling to a rotor or a similar component will be difficult. Thus, the powder with the grain diameter of 10 μm or more is designed to be 10% or less of the entire powder. This improves the magnetic property in the high iron (ferrum) concentration composition that contains Fe of 25 atomic percent or more.

Next, by sintering the green compact (pressed powder), the sintered body is formed. The sintering is carried out under an inert gas atmosphere such as an Ar gas or the like or under vacuum. In the case of sintering under the inert gas atmosphere, an evaporation of the element R such as Sm having high vapor pressure can be suppressed. Thus, it brings the benefit that composition deviation is unlikely to occur. However, under the inert gas atmosphere, it is difficult to avoid generation of the heterogeneous phase. Also, as the inert gas remains in pores, the pores are unlikely to dissolve. Thus, it makes it difficult for the sintered body to increase density. On the other hand, in the case of sintering under vacuum, generation of the heterogeneous phase can be suppressed. However, under vacuum, amount of evaporation of the element R having high vapor pressure becomes large. Thus, it makes it difficult to control the composition of the sintered body to have an appropriate alloy composition as the permanent magnet.

Moreover, the above mentioned ratio of the carbide phase of the element M varies depending on an amount of moisture and an amount of carbon in the sintering furnace. The reason thereof can be considered as follows. That is, for example, if the moisture or the like is attached (adhered) to the green compact when the green compact is injected (input) into the sintering furnace, then an oxygen molecule and a hydrogen molecule are generated by heat decomposition of a water molecule at the time of sintering. The oxygen molecule is bound to the element R, and an oxide of element R is formed. The oxide of the element R causes the magnet property to be lowered. On the other hand, the hydrogen molecule is bound to carbon which is contaminated during, for example, the fabrication process, and a carbon hydride is formed. This carbon hydride reacts with, for example, the element M in the main phase so that the carbide of the element M is generated. Accordingly, it is considered that the ratio of the carbide phase of the element M can be controlled by controlling the amount of moisture and the amount of carbon in the sintering furnace.

In view of this consideration, it is effective to carry out an ultimate sintering process (normal (main) sintering process) under the inert gas atmosphere such as the Ar gas, after a pretreatment process (provisional sintering process) is carried out under vacuum. By applying the sintering process having both the pretreatment process under vacuum and the normal sintering process under the inert gas atmosphere like this, it is possible to reduce the amount of moisture and the amount of carbon in the sintering furnace, to suppress the generation of the carbide of the element M, and also to suppress the evaporation of Sm or the like having high vapor pressure. Accordingly, when the magnetic powder (alloy powder) of high Fe concentration is used, it is possible to obtain a sintered body having high density and little composition deviation in which the generation of the carbide of the element M is suppressed. By obtaining the above mentioned sintered body, it is possible to sufficiently advance mutual diffusion between Fe and Cu in the following solution heat treatment process and the aging treatment process. Accordingly, it is possible to expand the difference in Fe concentration between the cell phase and the cell wall phase. As a result, a region of the cell structure can be increased.

When the magnetic powder (alloy powder) having Fe concentration equal to or greater than 25 atom % is sintered, it is preferable to maintain the vacuum until the temperature reaches close to the sintering temperature during the present sintering process as far as possible. Moreover, it is also effective to keep vacuum until the temperature reaches up to this sintering temperature. In this case also, it is possible to suppress the evaporation of the element R such as Sm or the like during sintering, by switching to the inert gas at the same time as this sintering temperature is reached. The reason why maintaining the vacuum until the temperature reaches close to the sintering temperature in the composition region of high Fe concentration is assumed that the generation of the heterogeneous phase can be more effectively suppressed by maintaining vacuum until the temperature reaches up to higher temperature as far as possible.

Assuming the temperature where the vacuum is switched to the inert gas is defined as a temperature $T_{V-G}$, and the holding temperature during the sintering process is defined as a temperature $T_S$, it is preferable to satisfy $T_{V-G} > T_S - 61°$ C. If $T_{V-G}$ is equal to or less than $T_S - 61°$ C., then the heterogeneous phase remains in the sintered body, and the magnet property is deteriorated. Further, it becomes difficult to sufficiently raise the density. More preferably, it satisfies $T_{V-G} > T_S - 50$, further preferably $T_{V-G} \geq T_S - 40$, yet further preferably $T_{V-G} \geq T_S - 30$.

Preferably, a degree of vacuum is equal to or less than $9 \times 10^{-2}$ Pa at the time of sintering under vacuum (pretreatment process). If it exceeds $9 \times 10^{-2}$ Pa, then the oxide of element R is excessively formed so that it becomes difficult to obtain good magnetic property. Further, the carbide phase of the element M is likely to be excessively generated. More preferably, a degree of vacuum is equal to or less than $5 \times 10^{-2}$ Pa during pretreatment process, and further preferably, it is equal to or less than $1 \times 10^{-2}$ Pa.

Moreover, the amount of moisture and the amount of carbon also varies depending on the degree of humidity (moisture) in the installation environment of the sintering furnace. For example, if the degree of humidity is extremely high, then the moisture or the like is likely to attach (adhere) to the green compact when the green compact is injected into the sintering furnace. This is because the moisture or the like is not sufficiently discharged. Thus, when the degree of humidity is high, there is a case where the ratio of the carbide phase of the element M cannot be sufficiently small even if the pretreatment process is carried out under vacuum.

In view of this, the holding time is set depending on the degree of humidity in the installation environment of the sintering furnace to carry out the pretreatment process. For example, assuming the degree of humidity in the installation environment of the sintering furnace is X (%), and the holding time during the pretreatment process is holding time Y (minutes), it is preferable to satisfy $X - 5 \leq Y < 5X$. If Y is less than −5, then the moisture remains and the carbide of the element M excessively precipitates. On the other hand, if Y is equal to or greater than 5X, then the carbide of the element M becomes extremely insufficient to adversely affect the mechanical strength. Further, too much evaporation of the element R causes the composition deviation, and the coercive force is lowered. It should be noted that certain degree of humidity may cause the condition that Y is equal to or less than 30. In this case, it is preferable to hold for 30 minutes or more from the viewpoint of stabilization of the magnetic property.

The degree of humidity is defined as follows. That is, a humidity measurement equipment is installed at a location within a distance less than 1 m from a sample entrance or exit of the sintering furnace and at a height equal to or greater than 50 cm from an installation plane of the sintering furnace. A humidity sensor used for the humidity measurement equipment is, preferably, for example, a polymer capacitive type. Next, the degree of humidity is measured every 10 minutes by the humidity measurement equipment within one hour before the sample is installed (injected) into the sintering furnace. The above mentioned measurement is carried out at least three times (six times at maximum), and an average value among obtained measurement values is defined as the degree of humidity X.

The pretreatment process is carried out for the holding time depending on the degree of humidity obtained by use of the above formula. After then, switching to the inert gas atmosphere, the normal sintering process is carried out. This make it possible to control the amount of moisture and the amount of carbon in the sintering furnace to the desired value. Thus, it is possible to control the ratio of the carbide phase of the element M. Accordingly, in the X-ray diffraction patterns obtained by the above mentioned X-ray diffraction measurement of the above mentioned sintered body, the ratio of $I_2$ to $I_1$ ($I_2/I_1$) can be greater than 25 and equal to or less than 80.

It is preferable that the holding temperature during the sintering process is equal to or less than 1225° C. This is in order to suppress the evaporation of the element R during the sintering, because it is predicted that as iron (Fe) concentration becomes higher, then the melting point becomes lower. More preferably, it is equal to or less than 1215° C., further preferably, equal to or less than 1205° C., yet further preferably, equal to or less than 1195° C. It is preferable that the holding time during the sintering process is between 0.5 hours and 15 hours inclusive. This makes it possible to obtain a dense (compact) sintering body. If the holding time is less than 0.5 hours, then the density of the sintering body becomes non-uniform (uneven). On the other hand, if the holding time is greater than 15 hours, then the better magnetic property is unlikely to be obtained due to the evaporation or the like of Sm in the powder. More preferably, the holding time is between 1 hour and 10 hours inclusive, further preferably between 1 hour and four hours inclusive.

Next, the solution heat treatment is carried out. The solution heat treatment is a treatment that forms a $TbCu_7$ crystal phase (1-7 crystal phase) serving as a precursor of a phase separated composition. In this solution heat treatment, a heat treatment is carried out by holding for between 0.5 hours and 24 hours inclusive at the temperature between 1100° C. and 1190° C. inclusive. If the holding temperature is lower than 1100° C. or higher than 1190° C. during the solution heat treatment, then the ratio of the $TbCu_7$ crystal phase existing in the sample after the solution heat treatment is small so that the magnetic property may possibly be deteriorated. Preferably, the holding temperature is between 1120° C. and 1180° C. inclusive, and more preferably, between 1120° C. and 1170° C. inclusive. Moreover, if the holding time is less than 0.5 hours during the solution heat treatment, then the constituent phase is likely to be un-uniform (uneven), the coercive force is likely to be lowered, the crystal grain size of the metallic structure is likely to be small, a ratio of the grain boundary phase may rise and the magnetization is likely to be lowered. Also, if the holding time is greater than 24 hours, then the magnetic property may possibly be deteriorated due to, for example, the evaporation of the element R in the sintered body. Preferably, the holding time is between 1 hour and 12 hours inclusive, and more preferably, between 1 hour and 8 hours inclusive. It should be noted that the oxidation of the powder can be suppressed by carrying out the solution heat treatment under vacuum or under the inert gas atmosphere such as Ar or the like. The solution heat treatment may be carried out concurrently with the sintering.

Between the sintering and the solution heat treatment, the holding for a certain period of time at intermediate temperature (also referred to as "quality improvement treatment" or "intermediate heat treatment") may be carried out. The quality improvement treatment is a treatment that controls the metallic structure, in particular, the macro structure. In this quality improvement treatment, preferably, the heat treatment is carried out by holding at the temperature 10° C. or more lower than, for example, the heat treatment temperature during the sintering (for example, the holding temperature during the present sintering process) and also 10° C. or more higher than the heat treatment temperature during the solution heat treatment, for between 2 hours and 12 hours inclusive. In general, in the solution heat treatment, the temperature is low, therefore, it is difficult to completely eliminate the heterogeneous phase which is generated during the sintering from the viewpoint of the element diffusion rate (speed). Also, as the grain growing rate is also slow, the sufficient crystal grain size may not possibly be obtained. Thus, the magnet property can be hardly improved. On the other hand, by carrying out the quality improvement treatment at the temperature 10° C. or more higher than the holding temperature during the solution heat treatment, the above mentioned heterogeneous phase can be sufficiently eliminated, and the crystal grain which constitutes the main phase can be larger.

For example, the holding temperature of the quality improvement treatment is preferably between 1140° C. and 1190° C. inclusive. If the temperature is lower than 1140° C. or higher than 1190° C., then the magnetic property may drop. If the heat treatment time is shorter than two hours, then the diffusion is insufficient, the heterogeneous phase is not removed sufficiently, and the improvement in the magnetic property is small. If the heat treatment time exceeds 12 hours, the R element may evaporate, and therefore a good magnetic property may not result. The heat treatment time in the quality improvement treatment is more preferably between four hours and ten hours inclusive, and further preferably between six hours and eight hours inclusive. It is also preferred that the quality improvement treatment may be carried out in a vacuum or an inert gas (e.g., Ar gas) atmosphere in order to avoid the oxidation.

Subsequently, the aging treatment is applied to the sintered body. The aging treatment is a treatment that regulates the metallic structure and increase the coercive force of the magnet. The aging treatment intends to separates the metallic structure of the magnet into a plurality of phases. In the aging treatment, the temperature is elevated to between 700° C. and 900° C. inclusive. Then, the reached temperature is maintained for between 0.5 hour and 80 hours inclusive (first holding). Subsequently, the slow cooling is carried out at the cooling rate of between 0.2° C./minute and 2° C./minute inclusive until the temperature drops to a value between 400° C. and 650° C. inclusive. The reached temperature is maintained for between 0.5 hour and 8 hours inclusive (second holding) for heat treatment. Then, the cooling is carried out until the temperature drops to room temperature. This provides the magnet of the sintered body.

If the first holding temperature is lower than 700° C. or higher than 900° C., the cell structure is not obtained sufficiently, thereby making it difficult to express the coercive force. The first holding temperature is, for example, more preferably between 750° C. and 880° C. inclusive, and particularly preferably between 780° C. and 850° C. inclusive. If the first holding time is less than 0.5 hour, an insufficient cell structure results, thereby making it difficult to express the coercive force. If the holding time is longer than 80 hours, the cell wall phase becomes excessively thick, and possibly the magnetic property is deteriorated. For example, the first holding time is preferably between 4 hours and 80 hours inclusive, more preferably between 8 hours and 70 hours inclusive, further preferably between 20 hours and 60 hours inclusive, and yet further preferably between 25 hours and 40 hours inclusive.

If the cooling rate of the slow cooling is less than 0.2° C./minute, then the cell wall phase tends to be excessively thick and the magnetization tends to decrease. If the cooling rate is greater than 2° C./minute, then a sufficient difference is not obtained in the Cu concentration between the cell phase and the cell wall phase. Thus, the coercive force tends to drop. The cooling rate of the slow cooling is preferably between 0.4° C./minute and 1.5° C./minute inclusive, and more preferably between 0.5° C./minute and 1.3° C./minute inclusive. If the slow cooling is performed to a temperature below 400° C., the heterogeneous phase tends to result. If the slow cooling is performed to a temperature over 650° C., the Cu concentration in the Cu rich phase does not rise sufficiently, and a sufficient coercive force may not result. If the second holding time is shorter than 0.5 hour or longer than eight hours, the heterogeneous phase is generated, and possibly a sufficient magnetic property is not obtained.

It should be noted that the temperature may be maintained at a prescribed value for a predetermined time during the slow cooling process of the aging treatment, and the slow cooling may be resumed from that temperature. It should also be noted that the above-described aging treatment may be regarded as the main aging treatment, and a preliminary aging treatment may be carried out prior to the main aging treatment. The preliminary aging treatment maintains the temperature at a value lower than the first holding temperature for the holding time shorter than the first holding time. The preliminary aging treatment can further enhance the magnetic property. The holding temperature of the preliminary aging treatment is, for example, between 650° C. and 790° C. inclusive. For example, the holding time in the preliminary aging treatment is preferably between 0.5 hour and 4 hours inclusive. Also, the slow cooling may be performed after the preliminary aging treatment. The cooling rate of the slow cooling after the preliminary aging treatment is preferably, for example, between 0.5° C./minute and 2.0° C./minute inclusive.

With the above-described processes, it is possible to fabricate the permanent magnet. In the above-described fabricating method, an amount of moisture and an amount of carbon are regulated during the sintering process to provide (fabricate) a permanent magnet that is excellent in the magnetic property and the mechanical strength.

Second Embodiment

The permanent magnet of the first embodiment is applicable to various motors and electric generators. The permanent magnet of the first embodiment is also applicable as a stationary magnet and a variable magnet for a variable magnetic flux motor and a variable magnetic flux electric generator. The use of the permanent magnet of the first embodiment enables to configure the various motors and electric generators. In applying the permanent magnet of the first embodiment to the variable magnetic flux motor, the configurations of the variable magnetic flux motor and a drive system may employ the known techniques.

Figure 3:
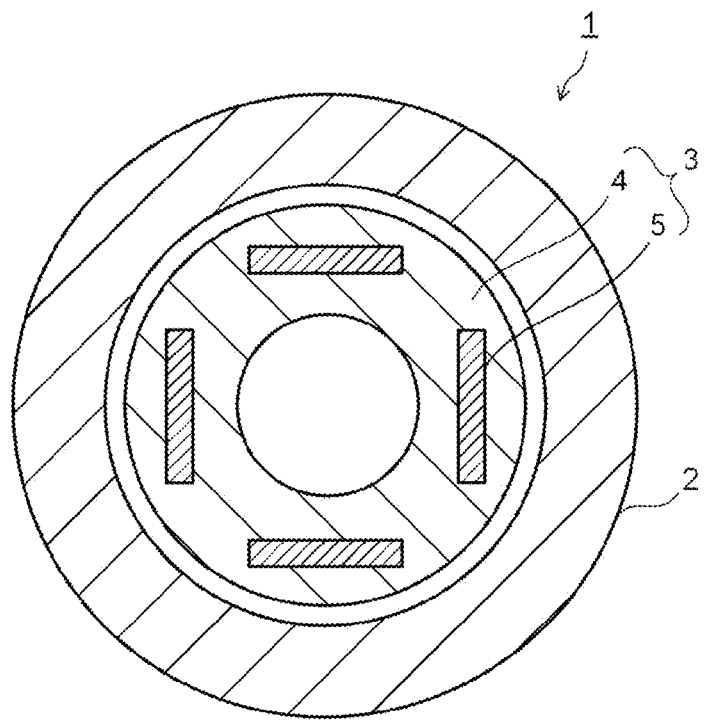
FIG. 3 illustrates a permanent magnet motor.

The motor having the permanent magnets, and the electric generator having the permanent magnets will be described below by referring to the accompanying drawings. FIG. 3 illustrates a permanent magnet motor. The permanent magnet motor 1 illustrated in FIG. 3 includes a rotor (a rotating part) 3 in a stator (stationary part) 2. The rotor 3 includes an iron core 4. The iron core 4 includes permanent magnets 5, which are the permanent magnets of the first embodiment. The use of the permanent magnets of the first embodiment can provide, for example, a highly efficient, downsized (compact), and low-cost permanent magnet motor 1 based on properties of the respective permanent magnets and other factors.

Figure 4:
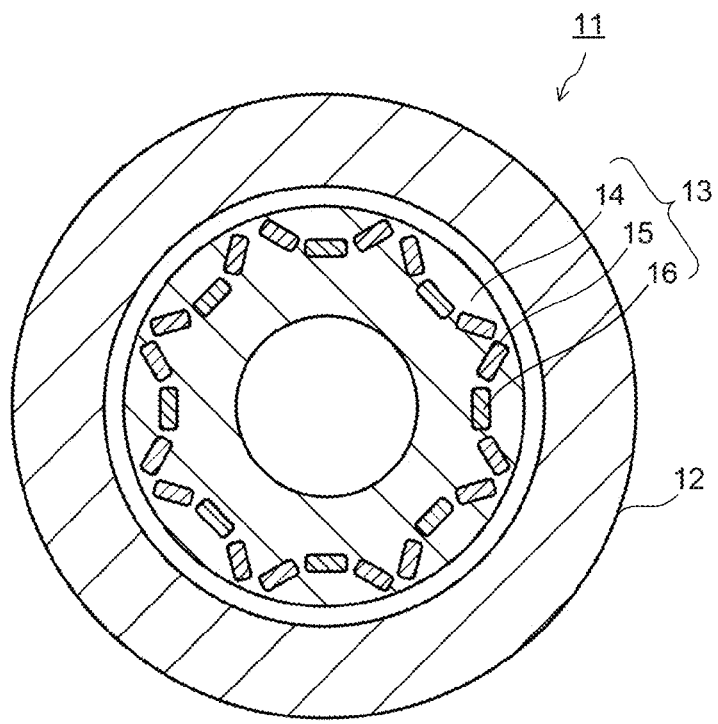
FIG. 4 illustrates a variable magnetic flux motor.

FIG. 4 illustrates a variable magnetic flux motor. The variable magnetic flux motor 11 illustrated in FIG. 4 includes a rotor (a rotating part) 13 in a stator (stationary part) 12. The rotor 13 includes an iron core 14. The iron core 14 includes stationary magnets 15 and variable magnets 16, both of which are the permanent magnets of the first embodiment. A magnetic flux density (a flux quantum) of the variable magnet 16 can be variable. Because a magnetization direction of the variable magnet 16 is perpendicular to a Q-axis direction, a Q-axis current does not affect the variable magnet 16. Accordingly, the variable magnet 16 can be magnetized by a D-axis current. The rotor 13 includes a magnetization coil (not illustrated). As an electric current flows from a magnetization circuit to this magnetization coil in this structure, the magnetic field directly acts on the variable magnet 16.

According to the permanent magnet of the first embodiment, the stationary magnet 15 can have (exert) a preferable coercive force. To apply the permanent magnet of the first embodiment to the variable magnet 16, it is only necessary to regulate the coercive force, for example, within the range of between 100 kA/m and 500 kA/m inclusive by changing the above-described various conditions (e.g., the aging treatment condition) for the manufacturing method. The variable magnetic flux motor 11 illustrated in FIG. 4 can use the permanent magnet of the first embodiment for both the stationary magnet 15 and the variable magnet 16. It should be noted that the permanent magnet of the first embodiment may be used for any one of the stationary magnet 15 and the variable magnet 16. The variable magnetic flux motor 11 can output a large torque with a small-size apparatus. Accordingly, the variable magnetic flux motor 11 is preferable as a motor of a hybrid vehicle, an electric vehicle, or a similar vehicle that requires a high-output and compact motor.

Figure 5:
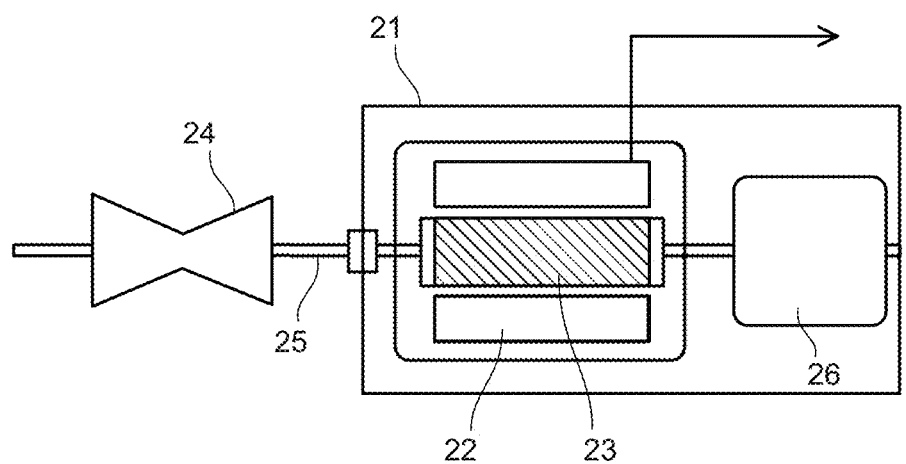
FIG. 5 illustrates an electric generator.

FIG. 5 shows an electric generator. The electric generator 21 illustrated in FIG. 5 includes a stator (stationary part) 22 that uses the permanent magnet. A rotor (a rotating part) 23 is disposed inside the stator (stationary part) 22. The rotor 23 is coupled to a turbine 24 via a shaft 25. The turbine 24 is disposed at one end of the electric generator 21. The turbine 24 is caused to rotate by, for example, a fluid supplied from the outside. It should be noted instead of rotating the shaft 25 by the turbine 24 that is actuated by the fluid, the shaft 25 may be rotated by dynamic rotation derived from regenerated energy of a vehicle or a similar energy. The stator 22 and the rotor 23 can use various known configurations.

The shaft 25 is in contact with a commutator (not illustrated). The commutator is disposed at the opposite side of the turbine 24 when viewed from the rotor 23. An electromotive force generated by the rotation of the rotor 23 is boosted to a system voltage and is transmitted as an output from the electric generator 21 via an isolated-phase bus and a main transformer (not illustrated). The electric generator 21 may be any of the usual electric generator and the variable magnetic flux electric generator. The rotor 23 generates a charge by static electricity from the turbine 2 and an axial current in association with electric generation. In view of this, the electric generator 21 includes a brush 26. The brush 26 discharges the charge from the rotor 23.

As described above, the application of the permanent magnet of the first embodiment to the electric generator brings about the advantageous effects such as high efficiency, downsizing, and low cost.

While certain embodiments of the present invention have been described, these embodiments have been presented by way of example only, and are not intended to limit the scope of the invention. Indeed, the novel embodiments described herein may be embodied in a variety of other forms. Various omissions, substitutions, changes and modifications may be made to the embodiments described herein without departing from the spirit and scope of the present invention. The appended claims and their equivalents are intended to cover such embodiments and modifications as would fall within the scope and spirit of the invention.

EXAMPLES

In the following Examples, specific examples of the permanent magnet will be described. In the following Examples, the M element of the permanent magnet contains Zr.

Examples 1 and 2

Respective raw materials for the permanent magnet were weighed, and mixed with each other at a prescribed ratio as shown in Table 1. The mixture was then melted by arc in an Ar gas atmosphere to prepare an alloy ingot. The alloy ingot was subjected to the heat treatment at 1160° C. for 20 hours. Then, the alloy ingot underwent coarse crushing and jet mill crushing such that an alloy powder was prepared as the raw material powder of the magnet. The prepared alloy powder was shaped (molded) to a particular form by pressing in a magnetic field to fabricate a green compact (pressed powder body).

Subsequently, the green compact of the alloy powder was put in a chamber of a sintering furnace. The interior of the chamber was evacuated to $3.2 \times 10^{-3}$ Pa, and heated to 1165° C. The reached temperature was maintained for 40 minutes. In one hour before the specimen was put in the sintering furnace, the humidity X was measured in the above-described manner. As shown in Table 1, the measured humidity X was 40%. Values of X-5 and 5X are also shown in Table 1. Then, an Ar gas was introduced into the chamber of the sintering furnace. The temperature of the chamber interior (Ar atmosphere) of the sintering furnace was elevated to 1225° C. The reached temperature was maintained for six hours to perform the sintering.

After that, the temperature was dropped to 1185° C. The reached temperature was maintained for four hours. Then, the slow cooling was carried out at the cooling rate of 5.0° C./minute until the temperature dropped to 1170° C. The sintered body was maintained at the reached temperature for 16 hours to carry out the solution heat treatment. The sintered body was cooled to room temperature. The cooling rate after the solution heat treatment was 150° C./minute.

The sintered body that had undergone the solution heat treatment was heated to 750° C. The reached temperature was maintained for 2.5 hours. Then, the sintered body was slowly cooled at the cooling rate of 2° C./minute until the temperature dropped to 300° C. In the following treatment (aging treatment), the temperature was elevated to 845° C., and the reached temperature was maintained for 25 hours. Then, the slow cooling was performed at the cooling rate of 1.0° C./minute until the temperature dropped to 650° C. The reached temperature was maintained for four hours. Then, the slow cooling was performed at the cooling rate of 1.0° C./minute until the temperature dropped to 400° C. The reached temperature was maintained for one hour. After that, the sintered body was cooled to room temperature in the furnace. A magnet was obtained in this manner.

The composition of the magnet was analyzed by an inductively coupled plasma (ICP) emission spectrochemical analysis method. The composition analysis was carried out by the ICP emission spectrochemical analysis method in the following manner. Firstly, a specimen that was taken from the prescribed measurement position of the sintered body was crushed (ground, pulverized) in a mortar. A certain amount of crushed specimen was measured by weight, and put in a quartz (silica) beaker. In addition, mixed acid (acid that includes nitric acid and hydrochloric acid) was put in the beaker. The beaker was heated to approximately 140° C. on a hot plate to completely melt the specimen in the beaker. The beaker was cooled as it was. Then, the specimen was moved to a PFA-made measuring flask to have a particular (predetermined) volume of specimen. This was used as the specimen solution.

The ICP emission spectrochemical analysis device was used to determine the quantities of components contained in the specimen solution with a calibration curve (standard curve) method. The ICP emission spectrochemical analysis device was SPS4000, manufactured by SII NanoTechnology Inc. The obtained composition of the magnet is shown in Table 1. The carbon concentration was measured by an infrared absorption method after combustion in a high-frequency induction furnace with a machine CS-444LS manufactured by LECO JAPAN Corporation. Also, the measurement of X-ray diffraction pattern was carried out by the X-ray diffraction method using a SmartLab X-ray diffractmeter, manufactured by RIGAKU Corporation, under the above-described conditions, and the resulting X-ray diffraction pattern was used to obtain the ratio $I_2/I_1$.

The coercive force, and the residual magnetization were also measured. The measurement results are shown in Table 2. The measuring device used for the Examples and Comparative Examples was HD2300, manufactured by Hitachi High-Technologies Corporation. Also, a transverse rupture strength (TRS) test, which relied on a three-point bending test, was used to measure a transverse rupture strength. A sample used in the TRS test had the following size: length of 40 mm×width of 4 mm×thickness of 3 mm. The span distance was 30 mm. A rod was pushed to a center part of the sample to measure the transverse rupture strength. The measurement was carried out at least five times for one sample, and an average of the measurement values was taken as the transverse rupture strength. The results are shown in Table 2.

Example 3

The respective raw materials were weighed and mixed with each other at a prescribed ratio shown in Table 1. The mixture was then melted by a high frequency wave in an Ar gas atmosphere to prepare an alloy ingot. The alloy ingot was subjected to the coarse crushing, and the heat treatment at 1180° C. for 4 hours. Then, the alloy ingot was rapidly cooled until the temperature dropped to room temperature. The alloy ingot underwent the coarse crushing and the jet mill crushing such that an alloy powder was prepared as the raw material powder of the magnet. The prepared alloy powder was shaped (molded) to a particular form by pressing in a magnetic field to fabricate a compact body.

Subsequently, the compact body of the alloy powder was put in the chamber of the sintering furnace. The interior of the chamber was evacuated to a vacuum degree of 9.5×10⁻³ Pa, and heated to 1180° C. The reached temperature was maintained for 60 minutes. As shown in Table 1, the humidity X was 34%. Values of X-5 and 5X are also shown in Table 1. Then, an Ar gas was introduced into the chamber of the sintering furnace. The temperature of the chamber interior (Ar atmosphere) of the sintering furnace was elevated to 1190° C. The reached temperature was maintained for 7 hours to perform the sintering. After that, the temperature was dropped to 1160° C. and the reached temperature was maintained for two hours. Then, the slow cooling was carried out at the cooling rate of 4.0° C./minute until the temperature dropped to 1135° C. The sintered body was maintained at the reached temperature for 16 hours to carry out the solution heat treatment. Then, the sintered body was cooled to room temperature. The cooling rate after the solution heat treatment was 190° C./minute.

The sintered body that had undergone the solution heat treatment was heated to 710° C. The reached temperature was maintained for 0.5 hour. Subsequently, the sintered body was subjected to the aging treatment, i.e., the sintered body was heated to 815° C., and the reached temperature was maintained for 50 hours. Then, the sintered body was slowly cooled at the cooling rate of 0.65° C./minute until the temperature dropped to 455° C. The reached temperature was maintained for four hours. Then, the slow cooling was performed at the cooling rate of 0.35° C./minute until the temperature dropped to 380° C. The reached temperature was maintained for one hour. After that, the sintered body was cooled to room temperature in the furnace. A magnet was obtained in this manner.

The ICP emission spectrochemical analysis device was used to determine the quantities of components contained in the specimen solution with a calibration curve (standard curve) method. The carbon concentration was measured by an infrared absorption method after combustion in a high-frequency induction furnace. The obtained composition of the magnet and the obtained carbon concentration are shown in Table 1. Similar to other Examples, the ratio $I_2/I_1$, the coercive force, the residual magnetization, and the transverse rupture strength were also measured. The measurement results are shown in Table 2.

Examples 4, 5 and 6

The respective raw materials were weighed and mixed with each other at a prescribed ratio shown in Table 1. The mixture was then melted by a high frequency wave in an Ar gas atmosphere to prepare an alloy ingot. The alloy ingot was subjected to the coarse crushing, and the heat treatment at 1160° C. for 16 hours. Then, the alloy ingot was rapidly cooled until the temperature dropped to room temperature. The alloy ingot underwent the coarse crushing and the jet mill crushing such that an alloy powder was prepared as the raw material powder of the magnet. The prepared alloy powder was shaped (molded) to a particular (predetermined) form by pressing in a magnetic field to fabricate a green compact.

Subsequently, the green compact of the alloy powder was put in the chamber of the sintering furnace. The interior of the chamber was evacuated to the vacuum degree of 5.5×10⁻³ Pa, and heated to 1160° C. The reached temperature was maintained for 60 minutes in Example 4, for 120 minutes in Example 5, and for 30 minutes in Example 6. The humidity X was 31%, as indicated in Table 1. The values of X-5 and 5X are also shown in Table 1. Then, an Ar gas was introduced into the chamber of the sintering furnace. The temperature of the chamber interior (Ar atmosphere) of the sintering furnace was elevated to 1180° C. The reached temperature was maintained for five hours to perform the sintering. After that, the temperature was dropped to 1150° C. and the reached temperature was maintained for ten hours. Then, the slow cooling was carried out at the cooling rate of 4.0° C./minute until the temperature dropped to 1130° C. The sintered body was maintained at the reached temperature for twelve hours to carry out the solution heat treatment. Then, the sintered body was cooled to room temperature. The cooling rate after the solution heat treatment was 220° C./minute.

The sintered body that had undergone the solution heat treatment was heated to 670° C. The reached temperature was maintained for 1.5 hours. Subsequently, the sintered body was subjected to the aging treatment, i.e., the sintered body was heated to 840° C., and the reached temperature was maintained for 45 hours. Then, the sintered body was slowly cooled at the cooling rate of 0.5° C./minute until the temperature dropped to 550° C. The reached temperature was maintained for one hour. Then, the slow cooling was performed at the cooling rate of 0.25° C./minute until the temperature dropped to 400° C. The reached temperature was maintained for one hour. After that, the sintered body was cooled to room temperature in the furnace. A magnet was obtained in this manner.

The ICP emission spectrochemical analysis device was used to determine the quantities of components contained in the specimen solution with a calibration curve (standard curve) method. The carbon concentration was measured by an infrared absorption method after combustion in a high-frequency induction furnace. The obtained composition of the magnet and the obtained carbon concentration are shown in Table 1. Similar to other Examples, the ratio the coercive force, the residual magnetization, and the transverse rupture strength were also measured. The measurement results are shown in Table 2.

Examples 7 and 8

The alloy powder having the same composition as Example 4 was used as the raw material. The alloy powder was shaped (molded) to a particular form by pressing in a magnetic field to fabricate a green compact. Subsequently, the green compact of the alloy powder was put in the chamber of the sintering furnace. The interior of the chamber was evacuated to the vacuum degree of 5.5×10⁻³ Pa, and heated to 1160° C. The reached temperature was maintained for 60 minutes. The humidity X was 60% in Example 7, and 25% in Example 8, as shown in Table 1. The values of X-5 and 5X are indicated in Table 1. Then, an Ar gas was introduced into the chamber of the sintering furnace. The temperature of the chamber interior (Ar atmosphere) of the sintering furnace was elevated to 1180° C. The reached temperature was maintained for five hours to perform the sintering. After that, the temperature was dropped to 1150° C. and the reached temperature was maintained for ten hours. Then, the slow cooling was carried out at the cooling rate of 4.0° C./minute until the temperature dropped to 1130° C. The sintered body was maintained at the reached temperature for twelve hours to carry out the solution heat treatment. Then, the sintered body was cooled to room temperature. The cooling rate after the solution heat treatment was 220° C./minute. Then, the aging treatment was applied in each Example in a similar manner to Example 4 to obtain a magnet.

The ICP emission spectrochemical analysis device was used to determine the quantities of components contained in the specimen solution with a calibration curve (standard curve) method. The carbon concentration was measured by an infrared absorption method after combustion in a high-frequency induction furnace. The obtained composition of the magnet and the obtained carbon concentration are shown in Table 1. Similar to other Examples, the ratio $I_2/I_1$, the coercive force, the residual magnetization, and the transverse rupture strength were also measured. The measurement results are shown in Table 2.

Example 9

The alloy powder that had the same composition as Example 4 was used as the raw material. The prepared alloy powder was shaped (molded) to a particular form by pressing in a magnetic field to fabricate a green compact. Subsequently, the green compact of the alloy powder was put in the chamber of the sintering furnace. The interior of the chamber was evacuated to the vacuum degree of $5.5 \times 10^{-3}$ Pa, and heated to 1160° C. The reached temperature was maintained for 90 minutes. The humidity X was 24%, as shown in Table 1. The values of X-5 and 5X are also shown in Table 1. Then, an Ar gas was introduced into the chamber of the sintering furnace. The temperature of the chamber interior (Ar atmosphere) of the sintering furnace was elevated to 1180° C. The reached temperature was maintained for five hours to perform the sintering. After that, the temperature was dropped to 1150° C. and the reached temperature was maintained for ten hours. Then, the slow cooling was carried out at the cooling rate of 4.0° C./minute until the temperature dropped to 1130° C. The sintered body was maintained at the reached temperature for twelve hours to carry out the solution heat treatment. Then, the sintered body was cooled to room temperature. The cooling rate after the solution heat treatment was 220° C./minute. Subsequently, the aging treatment was applied in each Example in a similar manner to Example 4. Thus, a magnet was obtained.

The ICP emission spectrochemical analysis device was used to determine the quantities of components contained in the specimen solution with a calibration curve (standard curve) method. The carbon concentration was measured by an infrared absorption method after combustion in a high-frequency induction furnace. The obtained composition of the magnet and the obtained carbon concentration are shown in Table 1. Similar to other Examples, the ratio $I_2/I_1$, the coercive force, the residual magnetization, and the transverse rupture strength were also measured. The measurement results are shown in Table 2.

Comparative Example 1

The magnet having the composition as shown in Table 1 was fabricated in the same manner as Examples 1 and 2. Similar to the Examples, the ICP emission spectrochemical analysis device was used to determine the quantities of components contained in the specimen solution with a calibration curve (standard curve) method. The carbon concentration was measured by an infrared absorption method after combustion in a high-frequency induction furnace. The obtained composition of the magnet and the obtained carbon concentration are shown in Table 1. Similar to other Examples, the ratio $I_2/I_1$, the coercive force, the residual magnetization, and the transverse rupture strength were also measured. The measurement results are shown in Table 2.

Comparative Example 2

The magnet having the composition as shown in Table 1 was fabricated in the same manner as Example 3. Similar to the Examples, the ICP emission spectrochemical analysis device was used to determine the quantities of components contained in the specimen solution with a calibration curve (standard curve) method. The carbon concentration was measured by an infrared absorption method after combustion in a high-frequency induction furnace. The obtained composition of the magnet and the obtained carbon concentration are shown in Table 1. Similar to other Examples, the ratio the coercive force, the residual magnetization, and the transverse rupture strength were also measured. The measurement results are shown in Table 2.

Comparative Example 3

The alloy powder that had the same composition as Example 4 was used as the raw material. The prepared alloy powder was shaped (molded) to a particular form by pressing in a magnetic field to fabricate a green compact in the same manner as Example 4. The green compact of the alloy powder was put in the chamber of the sintering furnace. The interior of the chamber was evacuated to the vacuum degree of $5.5 \times 10^{-3}$ Pa, and heated to 1160° C. The reached temperature was maintained for 300 minutes. The humidity X was 31%, which was the same as Example 4. Values of X-5 and 5X are also shown in Table 1. Then, an Ar gas was introduced into the chamber of the sintering furnace. The temperature of the chamber interior (Ar atmosphere) of the sintering furnace was elevated to 1180° C. The reached temperature was maintained for five hours to perform the sintering. After that, the temperature was dropped to 1150° C. and the reached temperature was maintained for ten hours. Then, the slow cooling was carried out at the cooling rate of 4.0° C./minute until the temperature dropped to 1130° C. The sintered body was maintained at the reached temperature for 12 hours to carry out the solution heat treatment. Then, the sintered body was cooled to room temperature. The cooling rate after the solution heat treatment was 220° C./minute. Subsequently, the aging treatment was applied in each Example in a similar manner to Example 4. Thus, a magnet was obtained.

The ICP emission spectrochemical analysis device was used to determine the quantities of components contained in the specimen solution with a calibration curve (standard curve) method. The carbon concentration was measured by an infrared absorption method after combustion in a high-frequency induction furnace. The obtained composition of the magnet and the obtained carbon concentration are shown in Table 1. Similar to other Examples, the ratio $I_2/I_1$, the coercive force, the residual magnetization, and the transverse rupture strength were also measured. The measurement results are shown in Table 2.

Comparative Examples 4 and 5

The alloy powder that had the same composition as Example 4 was used as the raw material. The prepared alloy powder was shaped (molded) to a particular form by pressing in a magnetic field to fabricate a green compact in the same manner as Example 4. The green compact of the alloy powder was put in the chamber of the sintering furnace. The interior of the chamber was evacuated to the vacuum degree of $5.5 \times 10^{-3}$ Pa, and heated to 1160° C. The reached temperature was maintained for 10 minutes in Comparative Example 4 and 60 minutes in Comparative Example 5. As shown in Table 1, the humidity X was 75% in Comparative Example 4 and 83% in Comparative Example 5. Values of X-5 and 5X are also shown in Table 1. Then, an Ar gas was introduced into the chamber of the sintering furnace. The temperature of the chamber interior (Ar atmosphere) of the sintering furnace was elevated to 1180° C. The reached temperature was maintained for five hours to perform the sintering. After that, the temperature was dropped to 1150° C. and the reached temperature was maintained for ten hours. Then, the slow cooling was carried out at the cooling rate of 4.0° C./minute until the temperature dropped to 1130° C. The sintered body was maintained at the reached temperature for 11 hours to carry out the solution heat treatment. Then, the sintered body was cooled to room temperature. The cooling rate after the solution heat treatment was 220° C./minute. Subsequently, the aging treatment was applied in each Example in a similar manner to Example 4. Thus, a magnet was obtained.

The ICP emission spectrochemical analysis device was used to determine the quantities of components contained in the specimen solution with a calibration curve (standard curve) method. The carbon concentration was measured by an infrared absorption method after combustion in a high-frequency induction furnace. The obtained composition of the magnet and the obtained carbon concentration are shown in Table 1. Similar to other Examples, the ratio $I_2/I_1$, the coercive force, the residual magnetization, and the transverse rupture strength were also measured. The measurement results are shown in Table 2.

It is obvious from Tables 1 and 2 that the permanent magnets of Examples 1 to 9 have, at least a higher residual magnetization, as compared to, for example, the permanent magnet of Comparative Example 1 that has a low Fe concentration and the permanent magnet of Comparative Example 2 that has a low R concentration. Also, the permanent magnets of Examples 1 to 9 have a higher coercive force, a higher residual magnetization, and a higher transverse rupture strength, as compared to, for example, the permanent magnet of Comparative Example 3 that has the $I_2/I_1$ ratio of less than 25 and the permanent magnets of Comparative Examples 4 and 5 that has the $I_2/I_1$ ratio of over 80. Therefore, it is understood that the magnetic property and the mechanical strength are enhanced by adjusting the composition and the $I_2/I_1$ value in the prescribed ranges.

As described above, the permanent magnets of Examples 1 to 9 have the regulated (controlled) $I_2/I_1$ value in the desired range, and therefore any of these permanent magnets can demonstrate a high coercive force, high residual magnetization, and a high transverse rupture strength, even if the Fe concentration is high. It is therefore understood that the permanent magnets of Examples 1 to 9 are excellent in the magnetic property and the mechanical strength.

TABLE 1

| | Magnet Composition (atomic ratio) | Carbon Concentration (mass ppm) | X (%) | X − 5 (minute) | 5X (minute) | Holding Time (minute) |
|---|---|---|---|---|---|---|
| Example 1 | $Sm_{11.11}Co_{51.11}Fe_{28.00}Cu_{7.11}Zr_{2.22}Ti_{0.44}$ | 300 | 40 | 35 | 200 | 40 |
| Example 2 | $Sm_{9.89}Nd_{1.22}Co_{53.29}Fe_{28.89}Cu_{5.38}Zr_{1.33}$ | 200 | 40 | 35 | 200 | 40 |
| Example 3 | $Sm_{11.76}Co_{50.74}Fe_{29.91}Cu_{5.56}Zr_{1.94}Ni_{0.09}$ | 250 | 34 | 29 | 170 | 60 |
| Example 4 | $Sm_{11.05}Co_{50.79}Fe_{31.13}Cu_{5.25}Zr_{1.78}$ | 230 | 31 | 26 | 155 | 60 |
| Example 5 | $Sm_{11.05}Co_{50.79}Fe_{31.13}Cu_{5.25}Zr_{1.78}$ | 100 | 31 | 26 | 155 | 120 |
| Example 6 | $Sm_{11.05}Co_{50.79}Fe_{31.13}Cu_{5.25}Zr_{1.78}$ | 450 | 31 | 26 | 155 | 30 |
| Example 7 | $Sm_{11.05}Co_{50.79}Fe_{31.13}Cu_{5.25}Zr_{1.78}$ | 650 | 60 | 55 | 300 | 60 |
| Example 8 | $Sm_{11.05}Co_{50.79}Fe_{31.13}Cu_{5.25}Zr_{1.78}$ | 80 | 25 | 20 | 125 | 60 |
| Example 9 | $Sm_{11.05}Co_{50.79}Fe_{31.13}Cu_{5.25}Zr_{1.78}$ | 60 | 24 | 19 | 120 | 90 |
| Comparative Example 1 | $Sm_{11.11}Co_{55.56}Fe_{23.56}Cu_{7.11}Zr_{2.22}Ti_{0.44}$ | 300 | 40 | 35 | 200 | 45 |
| Comparative Example 2 | $Sm_{10.70}Co_{51.35}Fe_{30.27}Cu_{5.63}Zr_{1.96}Ni_{0.09}$ | 250 | 34 | 29 | 170 | 60 |
| Comparative Example 3 | $Sm_{11.05}Co_{55.79}Fe_{31.13}Cu_{5.25}Zr_{1.78}$ | 20 | 31 | 26 | 155 | 300 |
| Comparative Example 4 | $Sm_{11.05}Co_{50.79}Fe_{31.13}Cu_{5.25}Zr_{1.78}$ | 1200 | 75 | 70 | 375 | 10 |
| Comparative Example 5 | $Sm_{11.05}Co_{50.79}Fe_{31.13}Cu_{5.25}Zr_{1.78}$ | 1000 | 83 | 78 | 415 | 60 |

TABLE 2

| | $I_2/I_1$ | Coercive Force (kA/m) | Residual Magnetization (T) | Transerve Repture Strength (MPa) |
|---|---|---|---|---|
| Example 1 | 55 | 1370 | 1.195 | 178 |
| Example 2 | 42 | 1420 | 1.2 | 162 |
| Example 3 | 38 | 1350 | 1.19 | 154 |
| Example 4 | 32 | 1440 | 1.215 | 165 |
| Example 5 | 26 | 1500 | 1.22 | 128 |
| Example 6 | 67 | 1390 | 1.215 | 190 |
| Example 7 | 75 | 1300 | 1.21 | 177 |
| Example 8 | 29 | 1470 | 1.22 | 115 |
| Example 9 | 27 | 1560 | 1.23 | 110 |
| Comparative Example 1 | 47 | 1650 | 1.125 | 151 |
| Comparative Example 2 | 40 | 150 | 1.045 | 144 |
| Comparative Example 3 | 18 | 1200 | 1.185 | 93 |
| Comparative Example 4 | 85 | 350 | 1.02 | 99 |
| Comparative Example 5 | 95 | 210 | 0.98 | 87 |

What is claimed is:

1. A permanent magnet comprising a sintered body, the sintered body comprising:
   a composition expressed by a composition formula $R_pFe_qM_rCu_rCo_{100-p-q-r-t}$, where R is at least one element selected from the group consisting of rare earth elements, M is at least one element selected from the group consisting of Zr, Ti, and Hf, p is a number satisfying $10.8 \leq p \leq 12.5$ atomic percent, q is a number satisfying $25 \leq q \leq 40$ atomic percent, r is a number satisfying $0.88 \leq r \leq 4.5$ atomic percent, and t is a number satisfying $3.5 \leq t \leq 13.5$ atomic percent, the composition including carbon in a range from 50 mass ppm to 1500 mass ppm; and a metallic structure including a main phase having a $Th_2Zn_{17}$ crystal phase, and a secondary phase having a carbide phase of the M element of the composition formula, a ratio $(I_2/I_1)$ of a maximum intensity $I_2$ of diffraction peaks at an angle 2θ in a range from 37.5 degrees to 38.5 degrees to a maximum intensity $I_1$ of diffraction peaks at the angle 2θ in a range from 32.5 degrees to 33.5 degrees being greater than 25 but no greater than 80 in an X-ray diffraction pattern obtained by applying an X-ray diffraction measuring method to the sintered body.

2. The magnet of claim 1, wherein the permanent magnet has a coercive force equal to or greater than 1300 kA/m, residual magnetization equal to or greater than 1.19 T, and a transverse rupture strength equal to or greater than 100 MPa.

3. The magnet of claim 1, wherein a density of the sintered body is equal to or greater than 8.2 g/cm³.

4. The magnet of claim 1, wherein the main phase has a cell phase having the $Th_2Zn_{17}$ crystal phase, and a Cu rich phase having a higher Cu concentration than the cell phase.

5. The magnet of claim 1, wherein 50 atomic percent or more of a total amount of the R element in the composition formula is Sm, and 50 atomic percent or more of the M element in the composition formula is Zr.

6. A motor comprising a permanent magnet recited in claim 1.

7. A generator comprising a permanent magnet recited in claim 1.

* * * * *